Figure 1:
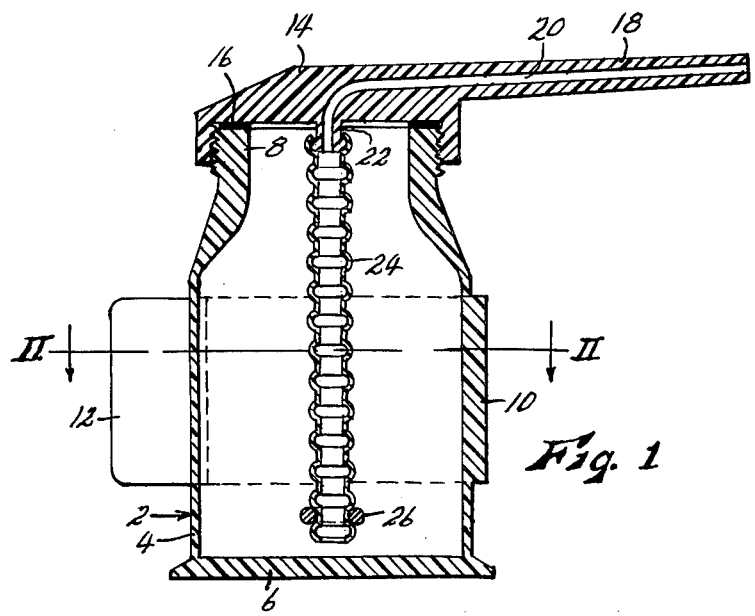

United States Patent [19]

Archer

[11] 4,069,950
[45] Jan. 24, 1978

[54] LIQUID DISPENSER

[76] Inventor: Farley J. Archer, 11621 Holmes Point Drive, Kirkland, Wash. 98033

[21] Appl. No.: 696,581

[22] Filed: June 16, 1976

[51] Int. Cl.² ............................................. B65D 37/00
[52] U.S. Cl. .................................... 222/210; 222/214; 222/211
[58] Field of Search ................ 222/95, 103, 206, 211, 222/213, 214, 215, 465, 470, 491, 494, 209, 465–467, 210; 401/183, 185, 156, 158, 159, 162; 128/231, 232

[56] References Cited

U.S. PATENT DOCUMENTS

| 75,693 | 3/1868 | Morrell | 128/232 |
|---|---|---|---|
| 473,516 | 4/1892 | Maranville | 222/210 |
| 1,728,161 | 9/1929 | Lower | 128/231 |
| 2,761,590 | 9/1956 | DuBois | 222/211 |
| 2,862,496 | 12/1958 | Hassler et al. | 222/103 |
| 3,331,537 | 7/1967 | Benedict | 222/470 |

FOREIGN PATENT DOCUMENTS

| 12,492 of | 1897 | United Kingdom | 222/214 |
|---|---|---|---|
| 735,659 | 8/1955 | United Kingdom | 222/211 |
| 229,643 | 4/1926 | United Kingdom | 222/95 |

Primary Examiner—Robert B. Reeves
Assistant Examiner—H. Grant Skaggs
Attorney, Agent, or Firm—John A. Hamilton

[57] ABSTRACT

A dispenser for lubricating oil or other liquids consisting of a flexible container having a sealing cap, the cap forming an elongated dispensing spout, a flexible tube connected to the spout passage of the cap and depending freely into the container, a weight affixed to the free end of the tube, a stiffening band partially encircling the container, being formed integrally therewith and integral handles projecting radially from the container at the spaced ends of the band.

4 Claims, 3 Drawing Figures

LIQUID DISPENSER

This invention relates to new and useful improvements in dispensing containers for lubricating oil or other liquids, and has particular reference to a dispenser in the general nature of a spouted container including means for ejecting a liquid from the container through the spout under pressure. An important object of the present invention is the provision of a liquid dispenser of the type described which is extremely simple, requiring in its basic form no moving parts whatsoever, such as the cylinders, plungers or pistons, springs, or operating levers commonly associated with dispensers of this general type. Broadly, this object is accomplished by the use of a flexible container having a sealing cap, the cap forming a slender dispensing spout of any desired length, the spout opening through the cap to the interior of the container, and a discharge tube connected to the interior end of the spout passage and depending within the container, whereby a deforming pressure exerted exteriorly on the container forces liquid from the container through the discharge tube and spout.

Another object is the provision of a liquid dispenser of the character described having novel means facilitating operation thereof by simple finger pressure on the exterior thereof, consisting of a relatively stiff constriction band partially encircling the container and having a pair of handles extending generally radially from the respective ends thereof, so that movement of the handles toward each other squeezes and reduces the volume of the container to generate pressure to discharge the liquid. By proportioning the band to the size of the container, a much larger container may be utilized than could otherwise be effectively utilized using only the fingers of the hand, and the band fingers also provide a convenient hand grip regardless of the size of the container. Also, the constriction band and fingers may be intergral with the container, so that their use requires no additional parts.

A further object is the provision of a liquid dispenser of the character described which may be used in any position, even directly inverted, and still discharge liquid effectively even though nearly empty. This is accomplished by the use of a highly flexible discharge tube having a weight attached to its free or depending end, whereby to position said free tube end, which of course is its intake end, below the liquid level of the container regardless of the position of the container.

Other objects are simplicity and economy of structure, and efficiency and dependability of operation.

Figure 2:
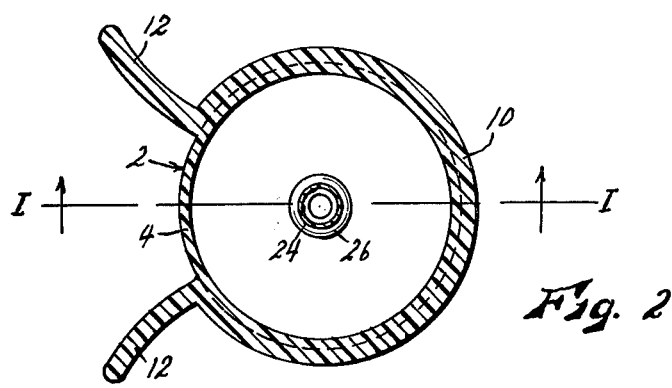
Figure 3:
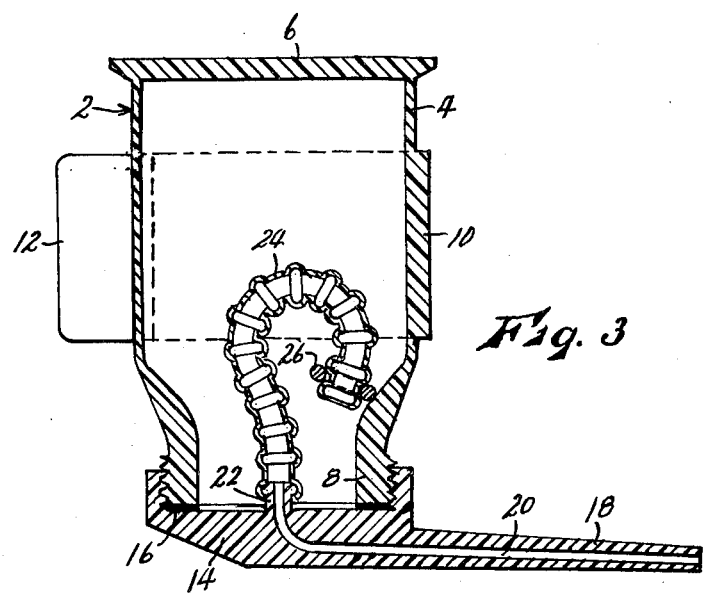

With these objects in view, as well as other objects which will appear in the course of the specification, reference will be had to the accompanying drawing, wherein:

FIG. 1 is a vertical sectional view of a liquid dispenser embodying the present invention, taken on line I—I of FIG. 2, FIG. 2 is a sectional view taken on line II—II of FIG. 1, and FIG. 3 is a view similar to FIG. 1, but showing the parts in the positions assumed when the dispenser is inverted.

Like reference numerals apply to similar parts throughout the several views, and the numeral 2 applies generally to the body portion of a liquid dispenser embodying the present invention. Said body member is hollow and is generally cylindrical in form about a vertical axis, being formed of a semi-rigid but flexible material such as certain types of plastic. It has a cylindrical side wall 4 sufficiently thin to render the container body readily compressible by finger pressure, and a relatively thick floor 6, being open at its top, having a reduced open neck 8 which is also relatively thick as compared to side wall 4, and which is externally threaded. A broad peripheral section of cylindrical side wall 4 is thickened to form a constriction band 10, which by reason of its increased thickness is relatively stiff as compared to the remainder of said side wall. Said constriction band has an angular extent of about 300°, its angular ends being spaced about 60 degrees apart. A thick handle 12 projects generally radially outwardly from each angular end of the constriction band, and also may be formed integrally with the constriction band and container body.

A sealing cap 14 is internally threaded for removable mounting on neck 8 of the container body, a sealing gasket 16 being disposed therebetween. Said cap may also be formed of plastic, and is formed to present an elongated, generally radially extending spout 18, the internal passage 20 of which opens at its outer end through the tip of said spout, and at its inner end through a tubular nipple 22 formed integrally with the cap centrally of its inner surface, so as to be generally coaxial with container body 2. A discharge tube 24, constituting a pliably flexible hose of any suitable type, is fitted over nipple 22 and depends within container body 2, being of such length as to extend just short of floor 6 when the device is upright as shown in FIG. 2. A weight 26, constituting a steel ring, encircles tube 24 closely adjacent its free end, and is fixed against longitudinal movement along said tube by any suitable means, such for example as its inclusion between bead-like formations of the tube itself.

In operation, container body 2 is filled or partially filled with oil or any other liquid to be dispensed, and cap 14 threaded tightly on body neck 8 so that a seal is formed by gasket 16. The device is held and supported by grasping handles 12, and liquid is dispensed through spout 18 by pressing said handles closer together. This causes said handles and band 10 to act as a manual constriction means, causing band 10 to be reduced to a smaller diameter, resiliently deforming container body 2 to constrict and reduce its internal volume, whereupon liquid is forced upwardly through discharge tube 24 and outwardly through spout passage 20. If the container body is only partially filled with liquid, constriction thereof compresses air in the portion thereof above the liquid level therein, and the resultant increased air pressure forces the liquid through tube 24 and spout 18. When handles 12 are released and the container body therefore resiliently expands to its normal configuration, the resulting reduction of pressure therein below atmospheric pressure sucks air inwardly through spout 18 and tube 24 to the interior of the container, so as to restore substantial atmospheric pressure therein.

It will be seen that constriction band 10, due to its increased thickness and hence greater stiffness as compared to the remainder of container wall 4, is constricted relatively uniformly over its entire area in response to pressure on handles 12. Therefor, since the area of band 10 is quite large as compared to the area of the container which could be pressed and restricted merely with the fingers of the hand of an operator, the constriction band greatly increases the ease and efficiency with which liquid may be dispensed. It also permits use of much larger containers than would be practical if it were not used. Also, since constriction band 10 and handles 12 are integral with the container body, their use does not require additional parts.

Thickened floor 6 of the container body assists in maintaining the container body in its normal contour, since its increased stiffness resists deformation by the action of the constriction ring. Thickened neck portion 8 also resists deformation by the action of the constriction ring, and this is important since deformation of the neck could destroy the seal provided by gasket 16.

The extreme, virtually pliable flexibility of discharge tube 24 is also important, since together with the weight 26 affixed to its free end, it provides that its free or intake end will always be disposed in the lower portion of the container, regardless of the position of the container, even when said container is completely inverted as shown in FIG. 3. This permits the dispenser to discharge liquid effectively in any position, even inverted, since weight 26 tends to pull the intake end of the tube below liquid level in the container regardless of container position. This of course would not be possible if the discharge tube were stiff or rigid.

While I have shown and described a specific embodiment of my invention, it will be readily apparent that many minor changes of structure and operation could be made without departing from the spirit of the invention.

What I claim as new and desire to protect by Letters Patent is:

1. A liquid dispenser comprising:
   a. a hollow body member adapted to contain liquid to be dispensed, and formed of resiliently flexible material,
   b. a cap applied removably to said body member in sealing relation thereto and including a tubular, outwardly directed spout,
   c. a discharge tube connected to said cap in communication with the internal passage of said spout and extending therefrom into the interior of said body member, being of such length as to extend to closely spaced apart relation from the wall of said body member opposite from said cap, and
   d. manual constricting means operable to constrict and compress said body member, whereby to reduce the internal volume thereof, said constricting means comprising a band of resiliently flexible material partially encircling said body member, its ends being disposed in angularly spaced apart relation, and a handle affixed to each end of said band and extending radially therefrom, whereby movement of said handles toward each other will constrict the internal area of said band, said body member, constricting band and handles being of one-piece integral construction, said constricting band and said handles being of greater wall thickness, as compared to said body member, to provide increased stiffness thereof.

2. A liquid dispenser as recited in claim 1 wherein said body member is generally cylindrical, having a generally planar floor at one end and an open, threaded neck at its opposite end, said cap being threaded on said neck, and wherein said constricting means comprises a thickened portion of the cylindrical wall of said body member forming a constricting band partially encircling said body member, with its ends disposed in angularly spaced apart relation, and a pair of handles integral with said body member and projecting generally radially outwardly, respectively from the opposite ends of said constricting band.

3. A liquid dispenser as recited in claim 2 wherein the constricting band portion of said body member is spaced apart from both the floor and neck portions of said body member, in a direction parallel to the cylindrical axis of said body member.

4. A liquid dispenser as recited in claim 3 wherein both the floor and neck portions of said body member are of greater wall thickness than the remainder of the cylindrical wall thereof, whereby to resist deformation thereof by any action of said constricting band as it is reduced in diameter by movement of said handles closer together.

* * * * *